US009208573B2

(12) United States Patent
Carceroni et al.

(10) Patent No.: US 9,208,573 B2
(45) Date of Patent: Dec. 8, 2015

(54) SYSTEMS AND METHODS FOR DETERMINING MOTION SALIENCY

(71) Applicant: Google Inc., Mountain View, CA (US)

(72) Inventors: Rodrigo Lima Carceroni, Mountain View, CA (US); Pannag Raghunath Sanketi, Mountain View, CA (US); Marius Renn, San Jose, CA (US); Ruei-Sung Lin, Redwood City, CA (US); Wei Hua, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/228,273

(22) Filed: Mar. 28, 2014

(65) Prior Publication Data

US 2015/0117707 A1    Apr. 30, 2015

Related U.S. Application Data

(60) Provisional application No. 61/897,209, filed on Oct. 29, 2013.

(51) Int. Cl.
  *G06K 9/00* (2006.01)
  *G06T 7/20* (2006.01)

(52) U.S. Cl.
  CPC ..... *G06T 7/2006* (2013.01); *G06T 2207/10016* (2013.01); *G06T 2207/20021* (2013.01)

(58) Field of Classification Search
  CPC ... H04N 5/145; H04N 5/225; H04N 21/2187; H04N 21/23418; H04N 21/234345; H04N 21/4728; H04N 21/854; H04N 5/228; H04N 9/64; H04N 9/87; G11B 27/00
  See application file for complete search history.

(56) References Cited

U.S. PATENT DOCUMENTS

| 6,782,054 B2* | 8/2004 | Bellers ..................... 375/240.27 |
| 8,594,488 B1* | 11/2013 | Grundmann et al. ......... 386/278 |
| 2004/0086046 A1* | 5/2004 | Ma et al. .................. 375/240.16 |

OTHER PUBLICATIONS

PCT/US2014/062323 International Search Report and Written Opinion, Mailed Dec. 17, 2014.
Fragkiadaki, Katerina et al; "Video Segmentation by Tracing Discontinuities in a Trajectory Embedding", Computer Vision and Pattern Recognition, 2012 IEEE Conference on IEEE, Jun. 16, 2012, pp. 1846-1853.
Li, Shan et al.; "Fast Visual Tracking using Motion Saliency in Video", 2007 IEEE International Conference on Acoustics, Speech, and Signal Processing, Apr. 15-20, 2007, pp. I-1073 through I-1076.
Yin,Zhaozheng et al.; "Belief Propagation in a 3D Spatio-temporal MRF for moving Object Detection", IEEE Conference on Computer Vision and Pattern Recognition, Jun. 18-23, 2007, pp. 1-8.
Jacobson, Natan et al.; "A Novel Approach to FRUC Using Discriminant Saliency and Frame Segmentation", IEEE Transactions on Image Processing, Nov. 1, 2010, pp. 2924-2934, vol. 19.

* cited by examiner

*Primary Examiner* — Tom Y Lu
(74) *Attorney, Agent, or Firm* — Troutman Sanders LLP; James E. Schutz; Parker D. Hancock

(57) ABSTRACT

Techniques for determining motion saliency in video content using center-surround receptive fields. In some implementations, images or frames from a video may be apportioned into non-overlapped regions, for example, by applying a rectilinear grid. For each grid region, or cell, motion consistency may be measured between the center and surround area of that cell across frames of the video. Consistent motion across the center-surround area may indicate that the corresponding region has low variation. The larger the difference between center-surround motions in a cell, the more likely the region has high motion saliency.

20 Claims, 6 Drawing Sheets

SYSTEMS AND METHODS FOR DETERMINING MOTION SALIENCY

CROSS-REFERENCE TO RELATED APPLICATIONS

This application claims priority and the benefit under 35 U.S.C. §119(e) of U.S. Provisional Patent Application No. 61/897,209, filed 29 Oct. 2013, the entire contents and substance of which are hereby incorporated by reference as if fully set forth below.

BACKGROUND

In recent years, there has been a proliferation of consumer digital cameras and camera-equipped mobile devices (e.g., smartphones and tablets). The cost of such devices and digital media storage continue to decrease, while usage continues to increase. Accordingly, there has been an explosion in the amount of digital video data produced and stored. However, much of this data—such as video recorded by surveillance feeds—consists of long-running content which may never be reviewed by a human.

Motion-detection techniques can help automatically identify activities and other elements of interest in video content that might prompt human interest. However, identifying motion-salient regions may impose a tradeoff between accuracy and efficiency. For example, a very fine motion analysis followed by detailed motion segmentation may produce satisfactory results, but the associated overhead generally makes this approach unpractical on computationally constrained devices. On the other hand, raw motion analysis may be performed quickly, but with inaccurate or noisy results.

SUMMARY

Some or all of the above deficiencies may be addressed by certain implementations of the disclosed technology. Certain implementations include techniques for determining motion saliency in video content using center-surround receptive fields. Moreover, some implementations may effectively identify motion-salient regions while being computationally inexpensive enough for implementation on mobile devices, such as smartphones, tablets, and digital cameras. Accordingly, implementations of the disclosed technology may provide an efficient and convenient motion-detection technique for use at a same camera-equipped mobile device used to capture the video content being analyzed.

According to an example implementation, a method is provided. The method may include receiving a plurality of frames representing video content. The method may further include defining a plurality of non-overlapping cells corresponding to a grid applied to the plurality of frames. The method may yet further include, measuring, for each cell of the plurality of cells and between the plurality of frames, a motion consistency associated with a center area of the plurality of frames and a corresponding surround area of the plurality of frames to the center area, the center area and surround area corresponding to the cell. The method may also include determining, an indication of how spatially localized motion is between the plurality frames by applying an entropy metric to the motion consistency measurements for the plurality of cells.

According to another example implementation, a computer readable medium is provided. The computer readable medium may store instructions that, when executed by at least one processor in a system, cause the processor to perform a method substantially similar to the method described hereinabove.

According to yet another example implementation, a system is provided. The system may include a memory operatively coupled to a processor and configured for storing data and instructions that may be executed by the processor. When executed, the system may be caused to perform a method substantially similar to the method described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
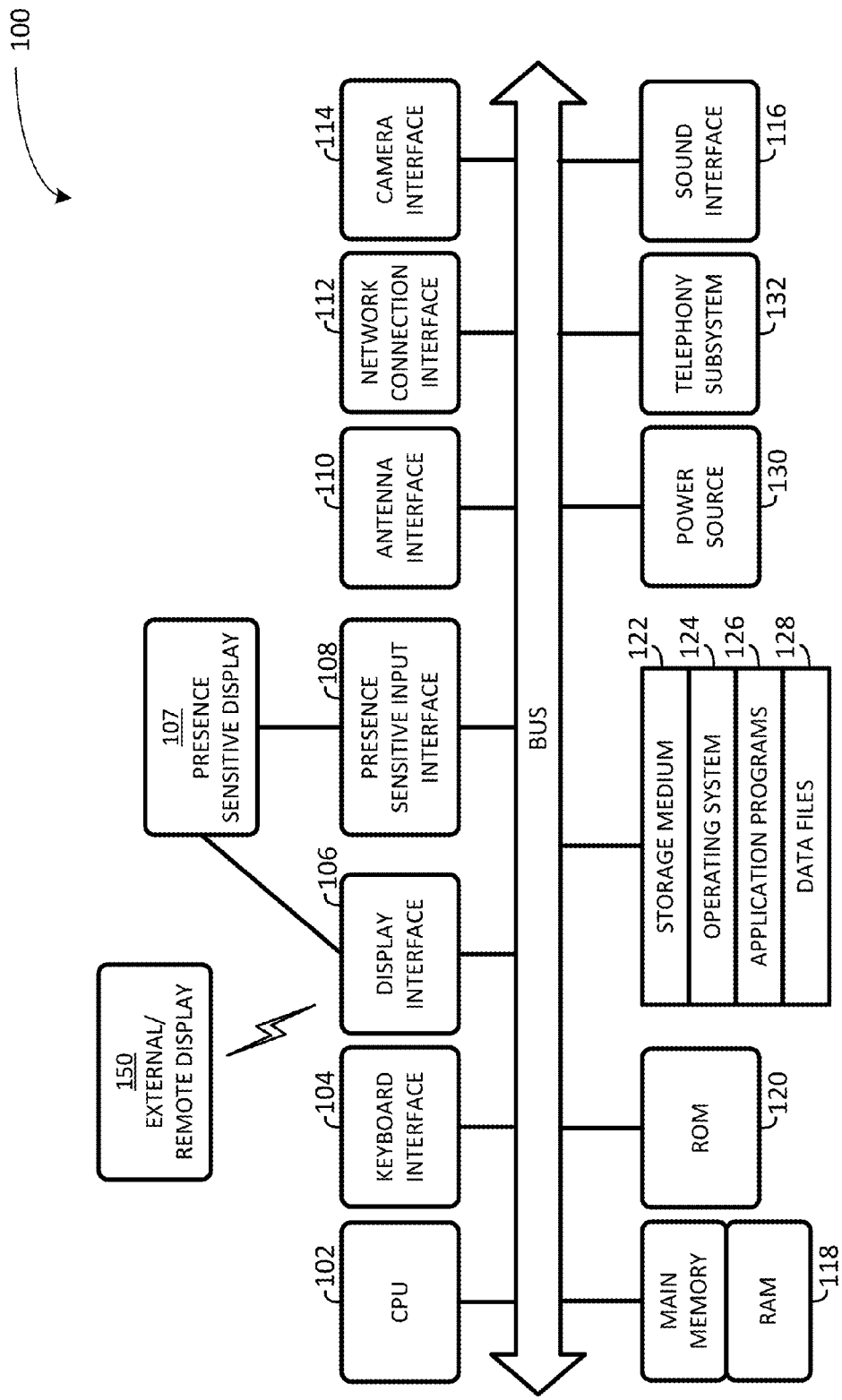
FIG. 1 depicts a block diagram of illustrative computing device architecture 100, according to an example implementation.

Implementations of the disclosed technology include techniques for determining motion saliency in video content using center-surround receptive fields. An important part of determining the intrinsic quality of a video (i.e., a quality approximating human preference or interest in a video) is detecting the presence of independently moving objects within a scene of the video. For example, a video featuring a child riding a bicycle down a street may be more "interesting" than a shot of the street itself. Similarly, a video of an apple being crushed may be more interesting than one of a stationary and intact apple.

Certain implementations of the disclosed technology include an approach adapted from the human visual system for effectively and efficiently identifying motion saliency regions in videos. Identified regions may be used to produce a quantized motion saliency map useful for video summarization tasks, such as identifying and tagging interesting intervals (e.g., short clips) in a lengthy video.

By leveraging center-surround receptive fields, implementations of the disclosed technology may operate in a "sweet spot," thereby capturing sufficient motion saliency information for video analysis with limited or reduced computation. Accordingly, some implementations may be effectively realized on computationally constrained mobile devices, such as smartphones, tablets, and digital cameras. The reduced computational load may also benefit cloud services with metered computation or battery-operated mobile devices, such as laptops.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for determining motion saliency in video content using center-surround receptive fields, and will now be described with reference to the accompanying figures.

Figure 2:
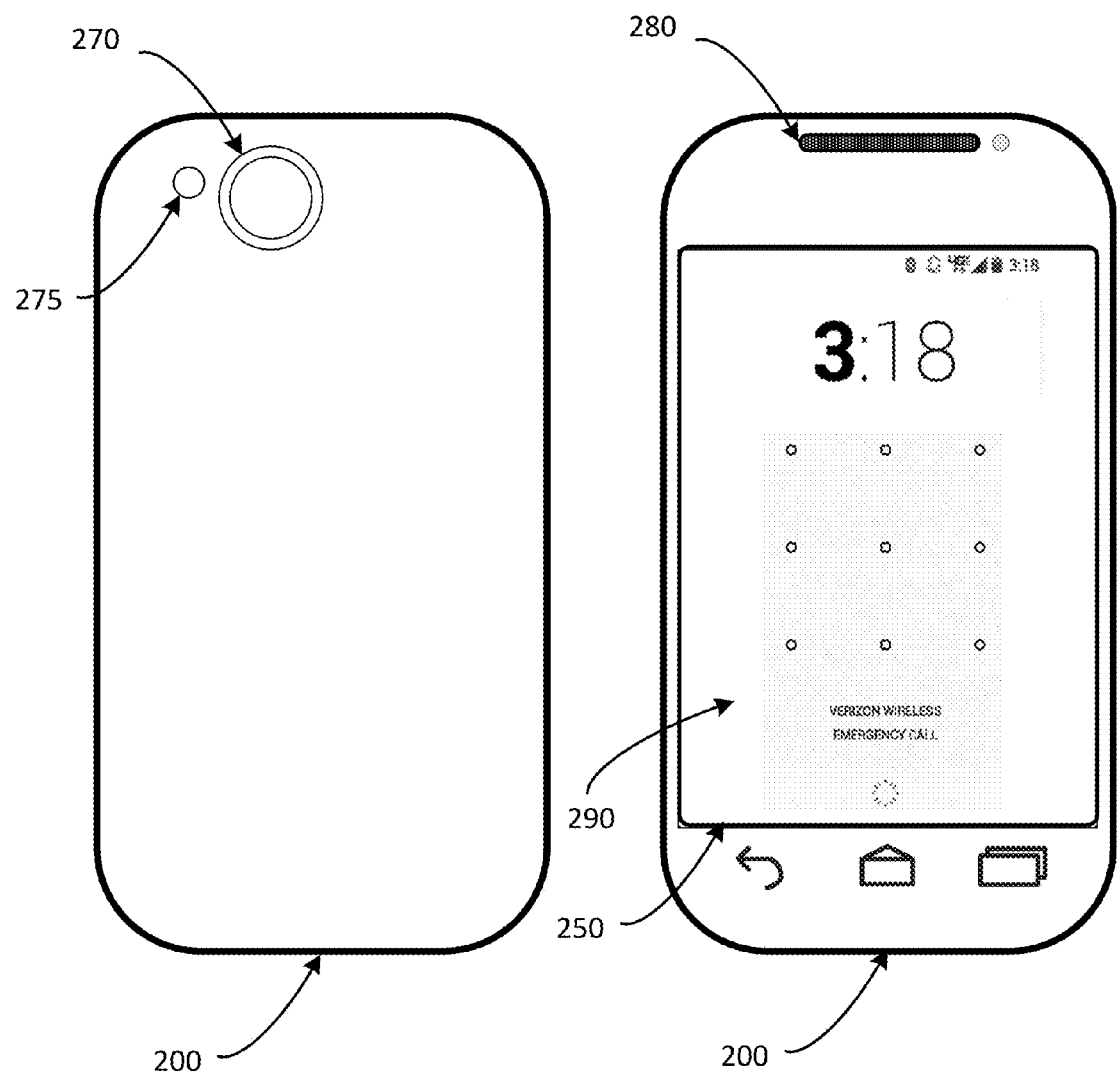
FIG. 2 depicts an illustration of a computing device 200, according to an example implementation.

FIG. 1 depicts a block diagram of illustrative computing device architecture 100, according to an example implementation. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device may be a mobile computing device, for example, a smartphone or a tablet. The mobile computing device may have a built-in or integrated display 250 for presenting a graphical user interface (GUI) 290 or other user interface. The display may be combined with a presence sensitive input device to form a touch-sensitive or presence-sensitive display for receiving user input from a stylus, finger, or other means of gesture input. In some implementations, the mobile computing device may also include or be associated with a sound producing device 250, such as a speaker, piezo-electric buzzer, or the like.

The mobile computing device 200 may be in communication with an image capture device 270 for capturing or recording content. As shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In certain implementations, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc.

Figure 3:
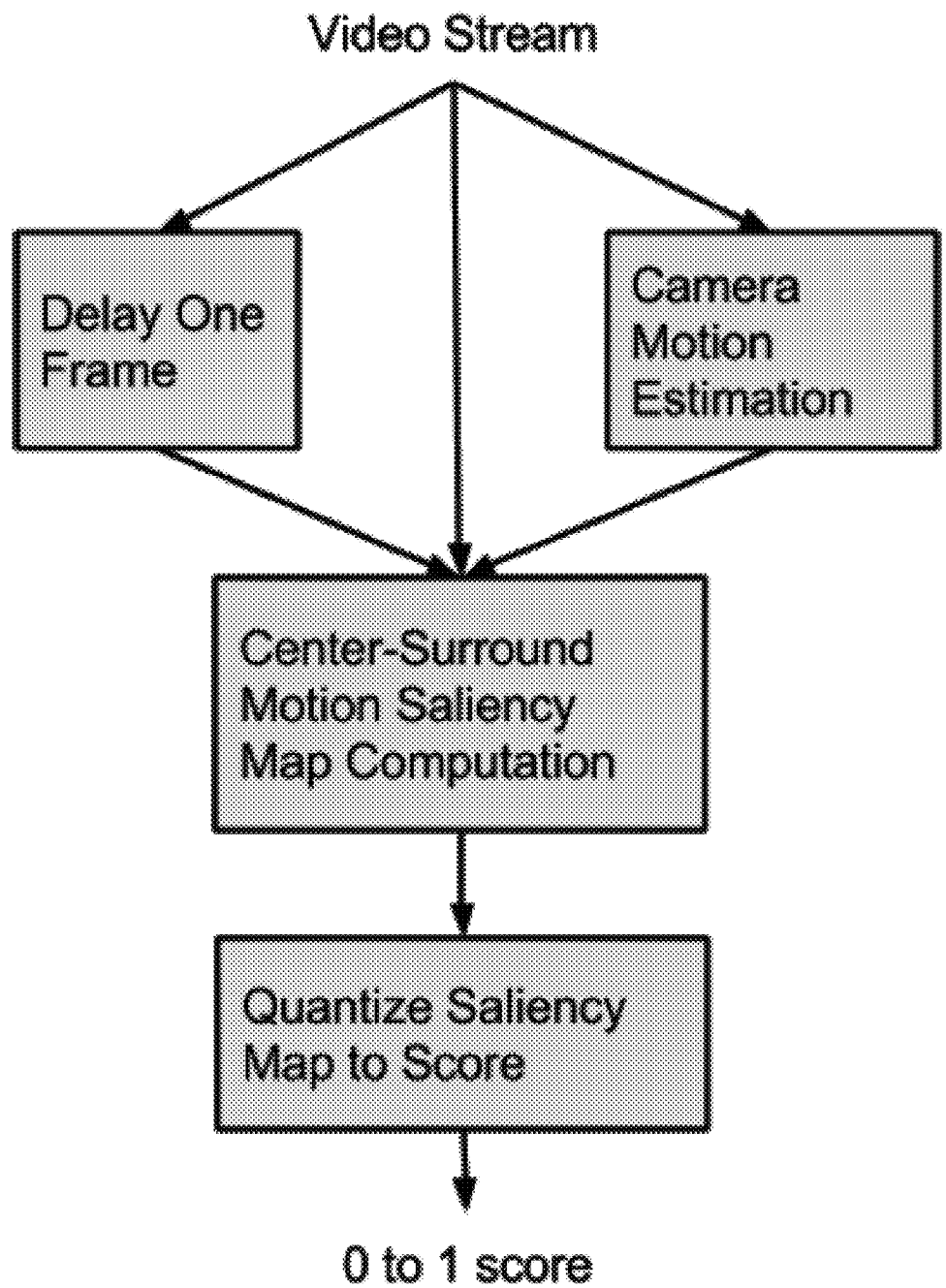
FIG. 3 is a flow diagram 300 of generating motion-saliency maps using center-surround motion saliency, according to an example implementation.
Figure 6:
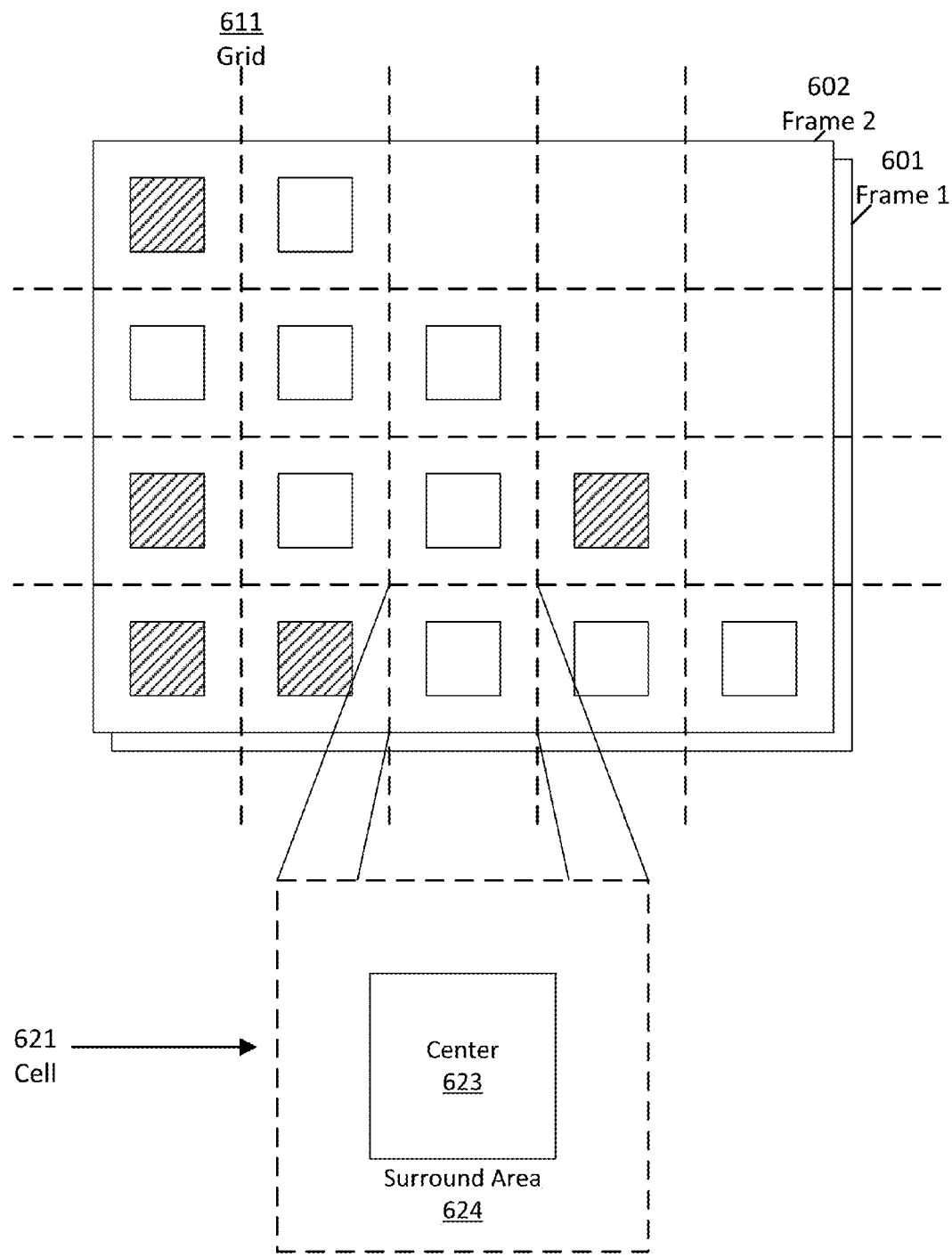
FIG. 6 is a block diagram 600 of a grid applied to frames of a video, according to an example implementation.

As described herein, implementations of the disclosed technology include techniques for determining motion saliency in video content using center-surround receptive fields, an idea adapted from the human visual system. FIG. 3 is a flow diagram 300 of generating motion-saliency maps using center-surround motion saliency, according to an example implementation. In some implementations, the disclosed technique may apportion images or frames 601 602 from a video into non-overlapped regions, for example, by applying a rectilinear grid 611, as shown in FIG. 6.

For each grid region, or cell 621, motion consistency may be measured between the center 623 and surround area 624 of that cell across frames 601 602 of the video. Consistent motion across the center-surround area may indicate that the corresponding region has low variation and may therefore warrant less attention. This is because detected consistent motion may often represent a static scene, with any movement in video likely caused by camera motion. On the other hand, inconsistent motion between center and surround regions may suggest with high probability that there is motion in the region other than, or beyond, the camera movement. This could be the motion of an independently moving object in the scene and thus, worth investigation. The larger the difference between center-surround motions in a cell, the more likely the region has high motion saliency.

In some implementations, by checking the center-surround motion consistency in each cell 621, the costly computation of recovering the exact camera motion may be avoided. Accordingly, the technique may quickly identify regions in the image that have salient motion activity. In some implementations, a heatmap of motion salient regions may be generated.

Figure 4:
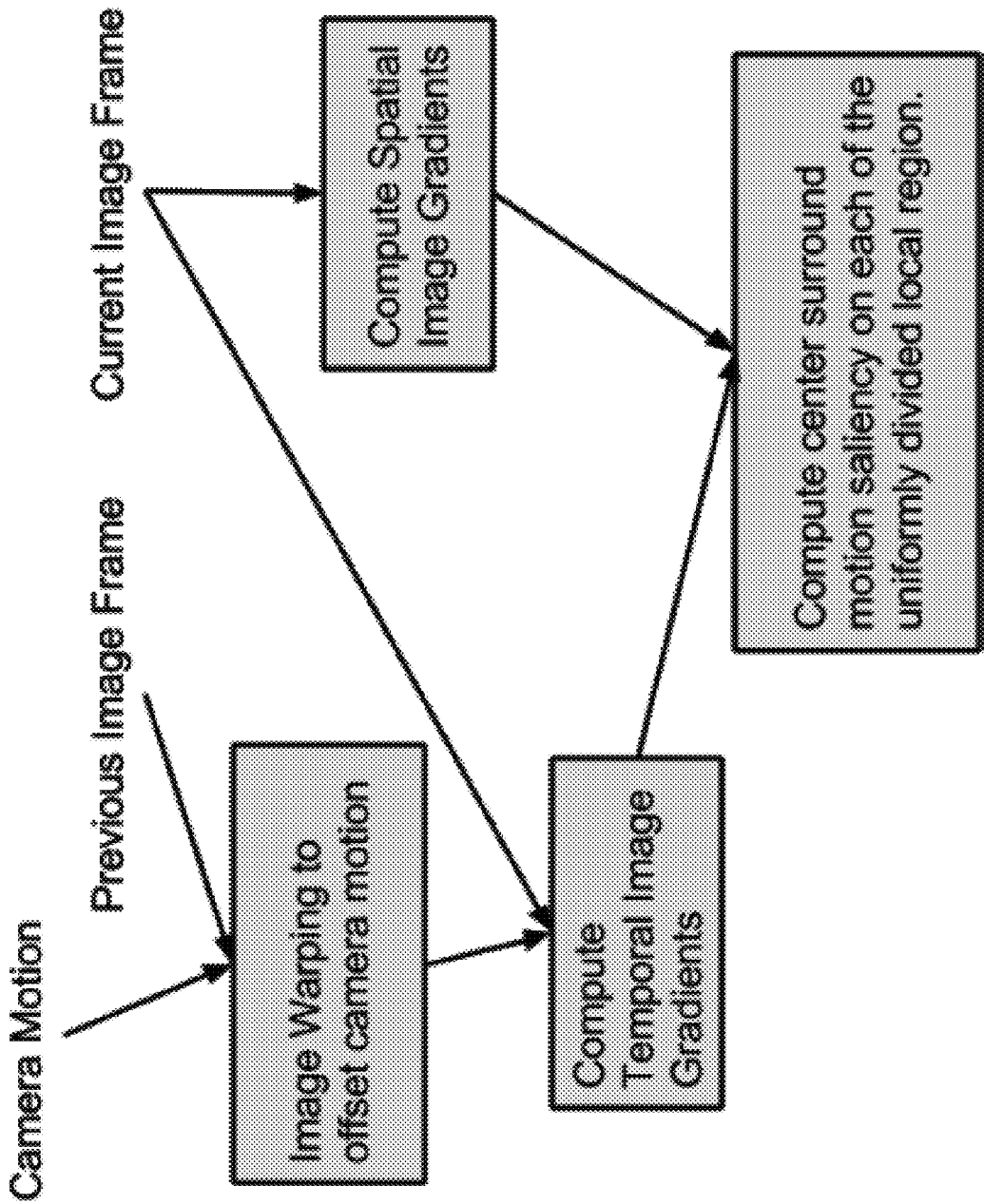
FIG. 4 is a flow diagram 400 of motion-saliency map computation, according to an example implementation

FIG. 4 is a flow diagram 400 of motion-saliency map computation, according to an example implementation. According to certain implementations, a patch-based motion estimation technique similar to the Lucas-Kanade algorithm may be used to measure motion:

$$\begin{bmatrix} V_x \\ V_y \end{bmatrix} = \begin{bmatrix} \sum_i I_x(q_i)^2, & \sum_i I_x(q_i)I_y(q_i) \\ \sum_i I_x(q_i)I_y(q_i), & \sum_i I_x(q_i)^2 \end{bmatrix}^{-1} \begin{bmatrix} \sum_i I_x(q_i)I_t(q_i) \\ \sum_i I_y(q_i)I_t(q_i) \end{bmatrix}.$$

In this example, V is the estimated motion, I is the image, and q is the pixel location. Subscript x and y in I indicate spatial gradients along x- and y-axes. Subscript t is the temporal gradient between current and previous frames. This is a patch-based approach because the summation above sums over all pixels in the patch.

In some implementations, the expression above may be used to estimate both center and surround motions. The length of the difference between the two motions may be measured, and the larger the difference, the higher the motion saliency may be in that region.

The above computation requires computing the inverse of structure tensor:

$$\begin{bmatrix} \sum_i I_x(q_i)^2, & \sum_i I_x(q_i)I_y(q_i) \\ \sum_i I_x(q_i)I_y(q_i), & \sum_i I_x(q_i)^2 \end{bmatrix}.$$

When this matrix is degenerated, it may introduce significant error in motion estimation. To mitigate this problem, the eigenvalues of this matrix and threshold may be computed on the smallest eigenvalue. If the smallest eigenvalue is smaller than a threshold, all motion estimation may be skipped and this region treated as non-salient. Using this approach, noise in the motion saliency map may be effectively suppressed.

After the initial motion saliency map is computed, certain implementations of the disclosed technique may further convert this map to a quantized measurement, for example, a score between zero and one. With this measurement, the spatial locations of saliency regions in the image may be neglected. Instead, the focus may be on the structure of the saliency map. A high score may be assigned to a saliency map in which the salient regions are close together. A saliency map with scattered salient regions may be scored lower. This may be accomplished by first downsampling the map so as to group neighboring regions into a joint cell. Then the entropy of this downsampled map may be measured by:

$$\text{Entropy} = -\frac{1}{N}\sum_{i,j} H(i,j)\log H(i,j),$$

$$N = \sum_{i,j} H(i, j),$$

where H(i, j) represents an entry of the downsampled map.

Lower entropy may indicate that salient regions are grouped in a small number of cells, and hence may be assigned a high saliency score. High entropy may indicate that salient regions are scattered across the image, and thus, may receive a low saliency score.

Computing entropy may require a normalization step and, thus, could cause two saliency maps with different scales of motion saliency to produce the same or similar saliency score. This may be mitigated by adding a default value or margin value to the motion saliency in each region as follows:

$$\text{Entropy} = -\frac{1}{N} \sum_{i,j} (H(i, j) + \epsilon) \log(H(i, j) + \epsilon).$$

In some implementations, this value may serve as a threshold and may be empirically assessed. If the motion saliency is much greater than this threshold, it may have almost no effect on its entropy. If the motion saliency is getting smaller and closer to this threshold, the modified distribution may become flatter and hence the entropy may increase. With this, motion saliency maps that have real interesting activities may be distinguished from motion saliency maps that are not very interesting (small in scale) but happen to have similar distribution of saliency regions.

Figure 5:
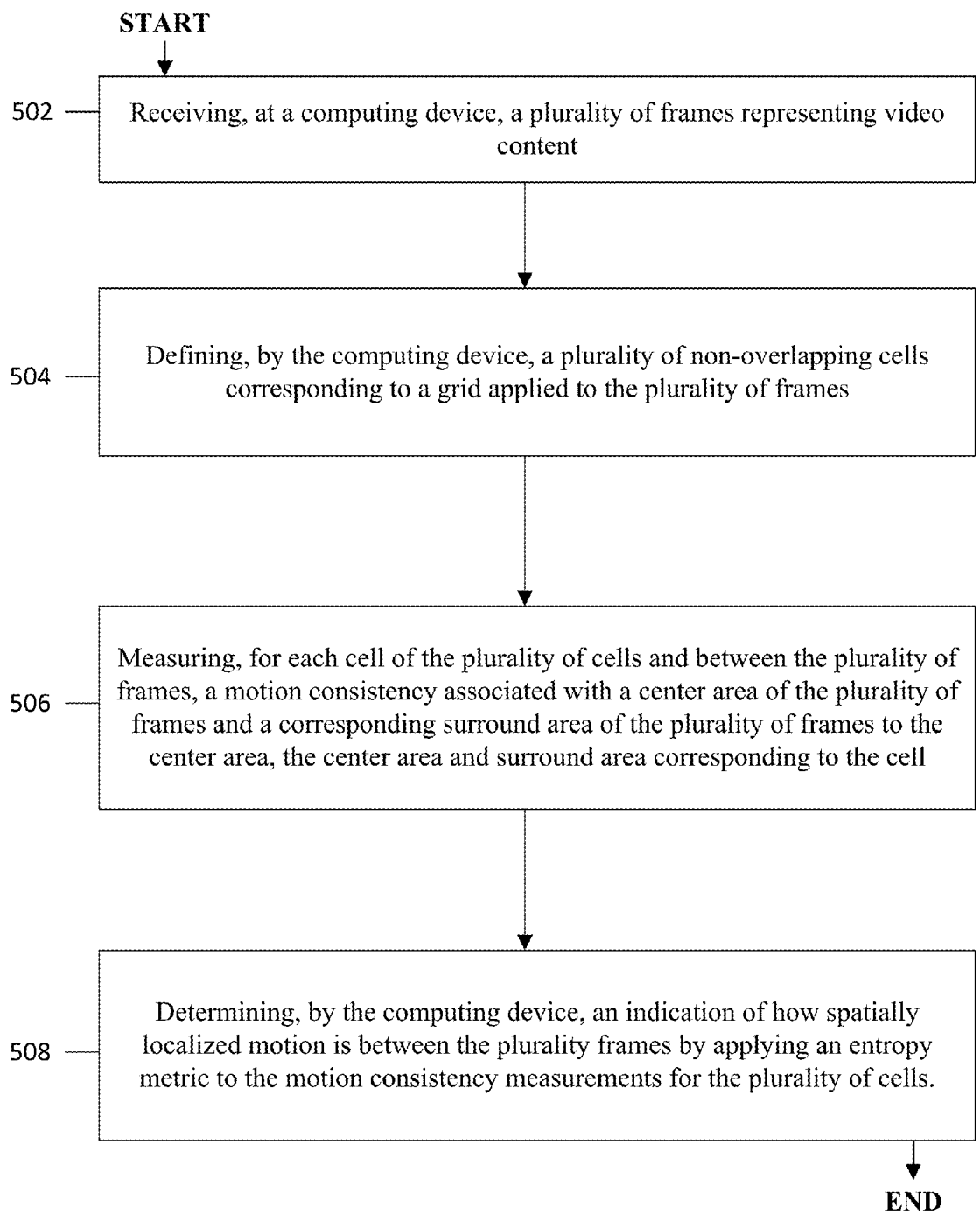
FIG. 5 is a flow diagram of a method 500 for determining motion saliency in video content using center-surround receptive fields, according to an example implementation.

FIG. 5 is a flow diagram of a method 500 for determining motion saliency in video content using center-surround receptive fields. As shown in FIG. 5, the method 500 starts in block 502, and, according to an example implementation, includes receiving, at a computing device, a plurality of frames representing video content. In block 504, the method 500 includes defining, by the computing device, a plurality of non-overlapping cells corresponding to a grid applied to the plurality of frames. In block 506, the method 500 includes measuring, for each cell of the plurality of cells and between the plurality of frames, a motion consistency associated with a center area of the plurality of frames and a corresponding surround area of the plurality of frames to the center area, the center area and surround area corresponding to the cell. In block 508, the method 500 includes determining, by the computing device, an indication of how spatially localized motion is between the plurality frames by applying an entropy metric to the motion consistency measurements for the plurality of cells.

It will be understood that the various steps shown in FIG. 5 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A method comprising:
defining, by a computing device, a plurality of cells corresponding to a grid applied to a plurality of frames, each cell of the plurality of cells comprising a respective center area and a corresponding surrounding area, the plurality of frames representing video content;
determining, for each respective cell of the plurality of cells and between the plurality of frames, a respective motion consistency, the respective motion consistency being based on the respective center area and the corresponding surrounding area of the respective cell; and
determining, by the computing device, and based on applying an entropy metric to the respective motion consistency measurements for the plurality of cells, an indication of spatially localized motion between the plurality frames.

2. The method of claim 1, further comprising:
tagging a portion of the video content based on the indication of the spatially localized motion as a video clip of interest, the video clip being shorter in duration than the video content.

3. The method of claim 1, further comprising:
generating a motion saliency heatmap associated with the video content based on the respective motion consistency for each cell of the plurality of cells.

4. The method of claim 1, wherein:
the plurality of frames is a pair of adjacent frames from the video content.

5. The method of claim 1, further comprising:
applying image stabilization to the plurality of frames before measuring the respective motion consistency.

6. The method of claim 1, further comprising:
quantizing for each cell of the plurality of cells, the respective motion consistency.

7. The method of claim 1, further comprising:
downsampling the respective motion consistency for each cell of the plurality of cells by considering neighboring cells as a joint cell.

8. The method of claim 1, wherein:
determining the motion consistency is based on a patch-based motion estimation.

9. The method of claim 1, wherein:
determining the motion consistency V is based on:

$$\begin{bmatrix} V_x \\ V_y \end{bmatrix} = \begin{bmatrix} \sum_i I_x(q_i)^2, & \sum_i I_x(q_i)I_y(q_i) \\ \sum_i I_x(q_i)I_y(q_i), & \sum_i I_x(q_i)^2 \end{bmatrix}^{-1} \begin{bmatrix} \sum_i I_x(q_i)I_t(q_i) \\ \sum_i I_y(q_i)I_t(q_i) \end{bmatrix};$$

wherein I represents an image;
subscript x and y in I indicate spatial gradients along x- and y-axes, respectively;
q represents a pixel location; and
t represents a temporal gradient between the plurality of frames.

10. The method of claim 1, wherein:
the entropy metric, E, is based on:

$$E = -\frac{1}{N} \sum_{i,j} H(i,j) \log H(i,j);$$

wherein H(i, j) represents a respective motion consistency for a respective cell from the plurality of cells at position (i, j); and
$N = \Sigma_{i,j} H(i,j)$.

11. The method of claim 1, wherein:
the entropy metric, E, is based on:

$$E = -\frac{1}{N} \sum_{i,j} (H(i,j) + \epsilon) \log(H(i,j) + \epsilon);$$

wherein H(i, j) represents a respective motion consistency for a respective cell from the plurality of cells at position (i, j);
$N = \Sigma_{i,j} H(i,j)$; and
$\epsilon$ represents a margin value.

12. A system comprising:
at least one memory operatively coupled to a computing device and configured for storing data and instructions that, when executed by the computing device, cause the computing device to perform a method comprising:
receiving, at the computing device, a plurality of frames representing video content;
defining, by the computing device, a plurality of non-overlapping cells corresponding to a grid applied to the plurality of frames;
determining, for each respective cell of the plurality of cells and between the plurality of frames, a respective motion consistency, the respective motion consistency being based on a respective center area and a corresponding surrounding area of the respective cell; and
determining, by the computing device, and based on applying an entropy metric to the respective motion consistency measurements for the plurality of cells, an indication of spatially localized motion between the plurality frames.

13. The system of claim 12, the method further comprising:
generating a motion saliency heatmap associated with the video content based on the respective motion consistency for each cell of the plurality of cells.

14. The system of claim 12, wherein:
the plurality of frames is a pair of adjacent frames from the video content.

15. The system of claim 12, the method further comprising:
applying image stabilization to the plurality of frames before measuring the motion consistency.

16. The system of claim 12, the method further comprising:
quantizing for each respective cell of the plurality of cells, the respective motion consistency.

17. The system of claim 12, the method further comprising:
downsampling the respective motion consistency for each respective cell of the plurality of cells by considering neighboring cells as a joint cell.

18. The method of claim 12, wherein:
determining the respective motion consistency is based on a patch-based motion estimation.

19. A computer program product comprising a non-transitory computer readable medium that stores instructions that, when executed by a computing device, cause the computing device to perform a method comprising:
receiving, at the computing device, a plurality of frames representing video content;
defining, by the computing device, a plurality of cells corresponding to a grid applied to the plurality of frames;

determining, for each respective cell of the plurality of cells and between the plurality of frames, a respective motion consistency, the respective motion consistency being based on a respective center area and a corresponding surrounding area of the respective cell; and determining, by the computing device, and based on applying an entropy metric to the respective motion consistency measurements for the plurality of cells, an indication of spatially localized motion between the plurality frames.

20. The computer program product of claim 18, the method further comprising:

generating a motion saliency heatmap associated with the video content based on the respective motion consistency for each cell of the plurality of cells.

* * * * *